United States Patent
Kogure

(10) Patent No.: US 12,296,802 B2
(45) Date of Patent: May 13, 2025

(54) VEHICLE BRAKE FLUID PRESSURE CONTROL DEVICE

(71) Applicant: HITACHI ASTEMO UEDA, LTD., Ueda (JP)

(72) Inventor: Kanako Kogure, Ueda (JP)

(73) Assignee: HITACHI ASTEMO UEDA, LTD., Nagano (JP)

( * ) Notice: Subject to any disclaimer, the term of this patent is extended or adjusted under 35 U.S.C. 154(b) by 201 days.

(21) Appl. No.: 18/003,716

(22) PCT Filed: Jun. 21, 2021

(86) PCT No.: PCT/JP2021/023296
§ 371 (c)(1),
(2) Date: Dec. 29, 2022

(87) PCT Pub. No.: WO2022/004442
PCT Pub. Date: Jan. 6, 2022

(65) Prior Publication Data
US 2023/0264662 A1    Aug. 24, 2023

(30) Foreign Application Priority Data

Jun. 30, 2020 (JP) .................................. 2020-112649

(51) Int. Cl.
*B60T 7/12* (2006.01)
(52) U.S. Cl.
CPC .......... *B60T 7/12* (2013.01); *B60W 2520/125* (2013.01); *B60W 2520/14* (2013.01); *B60W 2710/182* (2013.01)
(58) Field of Classification Search
CPC .......... B60T 7/12; B60T 7/122; B60T 13/662; B60W 2520/125; B60W 2520/14; B60W 2710/182
(Continued)

(56) References Cited

U.S. PATENT DOCUMENTS 7,512,474 B2    3/2009   Tabata et al.
7,641,291 B2    1/2010   Streit et al.
(Continued)

FOREIGN PATENT DOCUMENTS

JP    2006528579 A    12/2006
JP    2007055536 A    3/2007
(Continued)

OTHER PUBLICATIONS

Notice of Reasons for Refusal issued for Japanese Patent Application No. 2022-533868, Dispatch date: May 21, 2024, 8 pages including English machine translation.
(Continued)

*Primary Examiner* — Hai H Huynh
(74) *Attorney, Agent, or Firm* — HSML P.C.

(57) ABSTRACT

A vehicle brake fluid pressure control device that restrains a brake fluid pressure from decreasing counter to driver's intent during a vehicle stop time pressure holding control is disclosed. The vehicle brake fluid pressure control device is capable of exercising a vehicle stop time pressure holding control under which a brake fluid pressure is held when it is determined that a vehicle has been stopped. During the vehicle stop time pressure holding control (time t2 to t3), if a first condition which includes an amount of lateral motion (yaw rate Y) of the vehicle being equal to or greater than a specified value (Yth), and an absolute value (G) of front-ward/rearward acceleration undergone by the vehicle being equal to or greater than a first threshold (G1) is fulfilled, the vehicle stop time pressure holding control is canceled (time t3) even without operation of an operation member for operating the vehicle.

5 Claims, 8 Drawing Sheets

(58) Field of Classification Search
USPC .............................................. 701/70, 78, 83
See application file for complete search history.

(56) References Cited

U.S. PATENT DOCUMENTS

| | | |
|---|---|---|
| 9,610,926 B2 | 4/2017 | Harada et al. |
| 12,005,876 B2 * | 6/2024 | Takeda ................... B60T 7/122 |
| 2007/0050120 A1 | 3/2007 | Tabata et al. |
| 2007/0164608 A1 | 7/2007 | Streit et al. |
| 2014/0142825 A1 | 5/2014 | Harada et al. |

FOREIGN PATENT DOCUMENTS

| | | | |
|---|---|---|---|
| JP | 2014100923 A | 6/2014 | |
| JP | 2014172477 A | 9/2014 | |
| JP | 2017071313 A | 4/2017 | |

OTHER PUBLICATIONS

International Search Report issued for International Patent Application No. PCT/JP2021/023296, Date of mailing: Jul. 27, 2021, 5 pages including English translation.
Written Opinion issued for International Patent Application No. PCT/JP2021/023296, Date of mailing: Jul. 27, 2021, 8 pages including English translation.

* cited by examiner

VEHICLE BRAKE FLUID PRESSURE CONTROL DEVICE

TECHNICAL FIELD

This disclosure relates to a vehicle brake fluid pressure control device.

BACKGROUND ART

A vehicle brake fluid pressure control device that exercises a vehicle stop time pressure holding control under which a brake fluid pressure is held for example when a vehicle has been stopped and the brake fluid pressure held during the vehicle stop time pressure holding control is reduced when a yaw moment is applied to the vehicle is known in the art (see JP 2006-528579 A). In this technical scheme, if the vehicle stopped (with a brake fluid pressure being held accordingly) on a slope having a low coefficient of friction such as an ice-glazed road surface slides down while turning round, the brake fluid pressure will decrease, and the wheel lockup will be released, so that a driver can regain control over the vehicle by his/her own exertions.

SUMMARY OF INVENTION

However, the conventional scheme in which the brake fluid pressure is reduced based on the yaw moment or yaw rate during the vehicle stop time pressure holding control would disadvantageously cause the brake fluid pressure to decrease counter to driver's intent, for example, when the vehicle is stopped on a turntable in a multistory parking garage and a yaw moment is applied to the vehicle by the turning motion of the turntable.

It would be desirable to provide a vehicle brake fluid pressure control device which can restrain the brake fluid pressure from decreasing counter to driver's intent during the vehicle stop time pressure holding control.

Against this backdrop, a vehicle brake fluid pressure control device capable of exercising a vehicle stop time pressure holding control under which a brake fluid pressure is held when it is determined that a vehicle has been stopped is disclosed, the vehicle brake fluid pressure control device being configured such that if a first condition which includes an amount of lateral motion of the vehicle being equal to or greater than a specified value, and an absolute value of frontward/rearward acceleration undergone by the vehicle being equal to or greater than a first threshold is fulfilled during the vehicle stop time pressure holding control, the vehicle stop time pressure holding control is canceled even without operation of an operation member for operating the vehicle.

With this configuration, if the first condition is fulfilled, the vehicle stop time pressure holding control is canceled even without operation of the operation member; therefore, the vehicle stop time pressure holding control can be canceled quickly. By setting the first threshold at a value corresponding to a road surface slope with which the turntable is practically not placed, the brake fluid pressure can be restrained from decreasing counter to driver's intent even when an amount of lateral motion which would be imparted to the vehicle on the turntable is observed.

The vehicle brake fluid pressure control device may be configured such that if the first condition or a second condition which includes the amount of lateral motion of the vehicle being equal to or greater than the specified value and the operation of the operation member for operating the vehicle having been done is fulfilled during the vehicle stop time pressure holding control, the vehicle stop time pressure holding control is canceled.

With this configuration, during the vehicle stop time pressure holding control, even when the amount of motion has become equal to or greater than the specified value, the vehicle stop time pressure holding control is not canceled unless the operation of the operation member for operating the vehicle is done; therefore, even when an amount of lateral motion which would be imparted to the vehicle, for example, on a turntable in the multistory parking garage is observed, the brake fluid can be restrained from decreasing counter to driver's intent. On the other hand, when the vehicle stopped under the vehicle stop time pressure holding control on a slope having a low coefficient of friction such as an ice-glazed road surface slides down while turning round, an amount of lateral motion which would be imparted to the vehicle and an attempt made by the driver operating the operation member to regain control over the vehicle will trigger the cancellation of the vehicle stop time pressure holding control, which thus causes the brake fluid pressure to decrease, so that the driver can regain control over the vehicle successfully.

The second condition may further include the absolute value of the frontward/rearward acceleration undergone by the vehicle being equal to or greater than a second threshold.

The first threshold may be greater than the second threshold.

Since the second condition includes a condition that the operation of the operation member has been done, an error in determination which would occur on the turntable can be restrained even when the second threshold is set at a value corresponding to a road surface slope small enough for the turntable to be placed therewith.

The first threshold may be set based on an estimated road surface slope.

DESCRIPTION OF EMBODIMENTS

A detailed description will be given of one embodiment of a vehicle brake fluid pressure control device with reference made to the drawings where appropriate.

Figure 1:
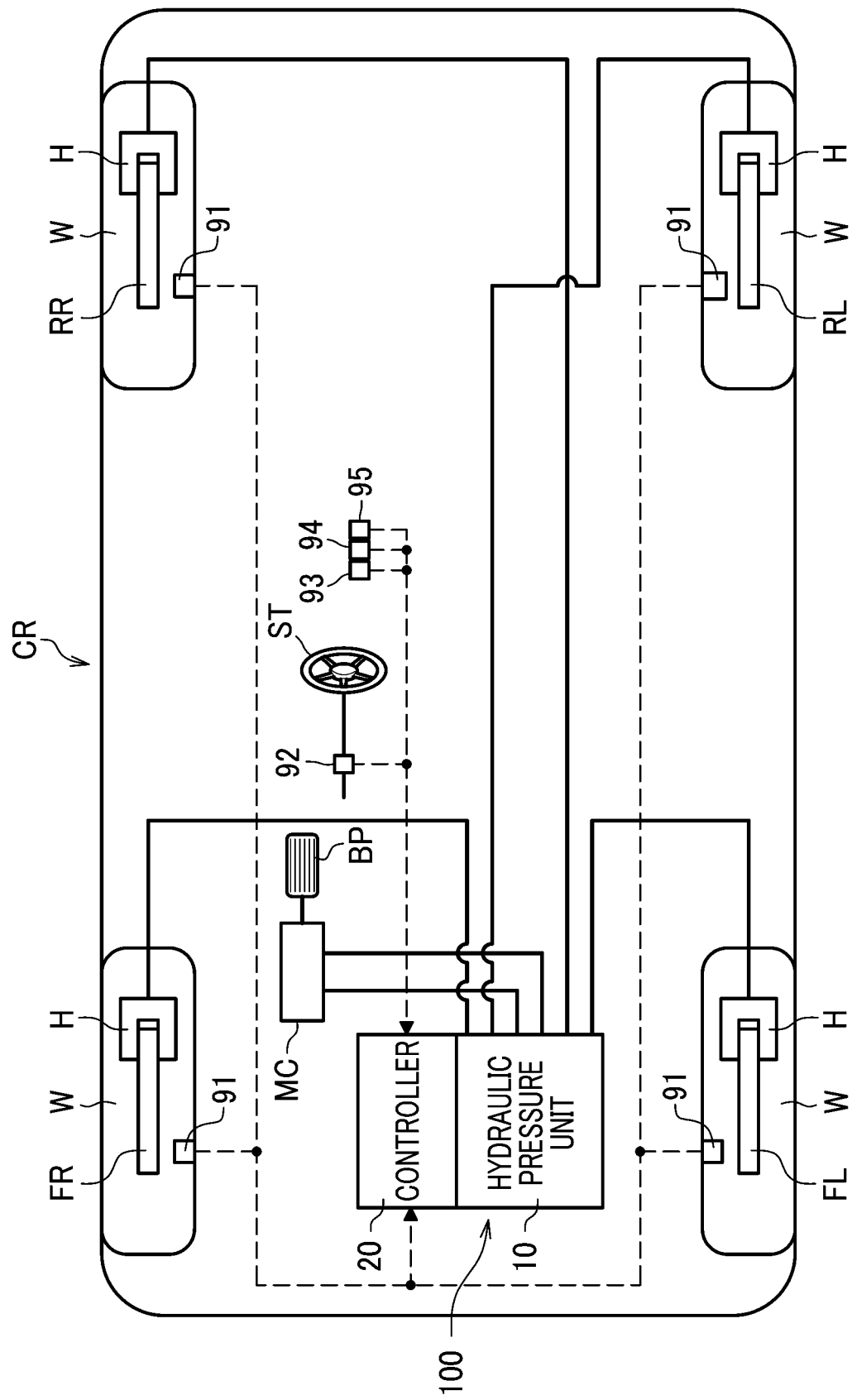
FIG. 1 is a schematic diagram of a vehicle equipped with a vehicle brake fluid pressure control device according to one embodiment.

As shown in FIG. 1, a vehicle brake fluid pressure control device 100 is a device for regulating a braking power (brake fluid pressure) applied to each of wheels W of a vehicle CR as appropriate. The vehicle brake fluid pressure control device 100 mainly includes a hydraulic pressure unit 10 provided with fluid paths (hydraulic line) and various parts, and a controller 20 for exercising control over the various parts in the hydraulic pressure unit 10 in a suitable way.

Wheel velocity sensors 91, a steering angle sensor 92, a lateral acceleration sensor 93, a yaw rate sensor 94, and an acceleration sensor 95 are connected to the controller 20. The wheel velocity sensors 91 detect wheel velocities of the wheels W. The steering angle sensor 92 detects a steering angle of a steering ST as an example of an operation member. The lateral acceleration sensor 93 detects acceleration undergone by the vehicle CR, as measured along its lateral axis. The yaw rate sensor 94 detects an angular velocity (yaw rate) of the vehicle CR which is turning, as an amount of lateral motion of the vehicle CR. The acceleration sensor 95 detects frontward/rearward acceleration undergone by the vehicle CR. The results of detection made by the sensors 91 to 95 are outputted to the controller 20.

The controller 20 comprises, for example, a CPU, a RAM, a ROM, and an input/output circuit, and is configured to exercise control by performing various operations based on inputs from the wheel velocity sensors 91, the steering angle sensor 92, the lateral acceleration sensor 93, the yaw rate sensor 94, the acceleration sensor 95, and a pressure sensor which will be described later (see FIG. 2), and programs and data stored in the ROM. Wheel cylinders H are hydraulic pressure devices that convert a brake fluid pressure generated by a master cylinder MC and the vehicle brake fluid pressure control device 100 into mechanical power of wheel brakes FR, FL, RR, RL provided for respective wheels W, and are connected to the hydraulic pressure unit 10 of the vehicle brake fluid pressure control device 100 respectively via piping.

Figure 2:
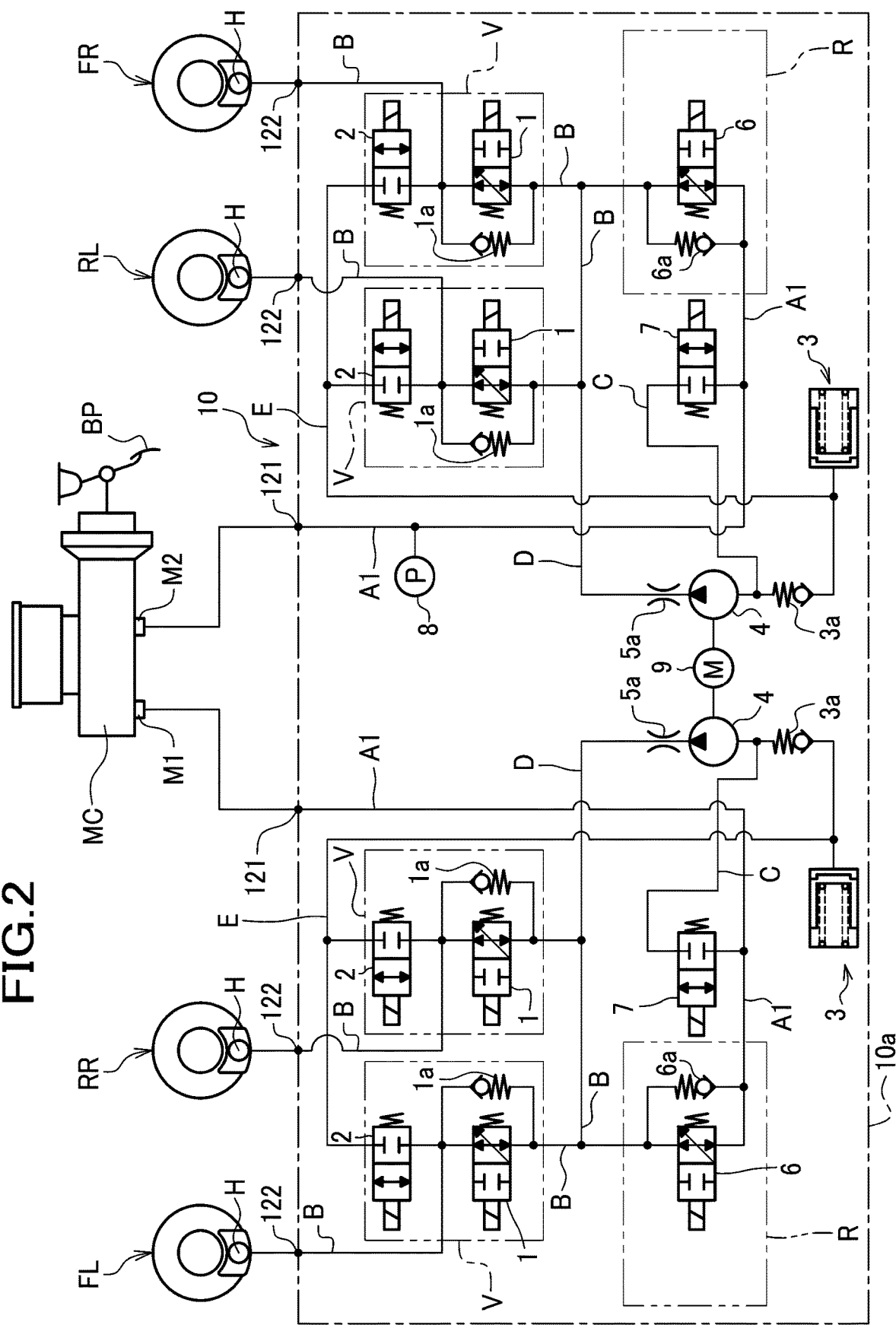
FIG. 2 is a brake fluid pressure circuit diagram of the vehicle brake fluid pressure control device.

As shown in FIG. 2, the hydraulic pressure unit 10 of the vehicle brake fluid pressure control device 100 is located between the master cylinder MC (as a fluid pressure source for producing a braking fluid pressure according to the depressing force of a brake pedal BP applied by a driver) and the wheel brakes FR, FL, RR, RL. The hydraulic pressure unit 10 is comprised of a pump body 10a that is a base body having fluid paths formed therein through which a brake fluid circulates, and a plurality of elements such as inlet valves 1, outlet valves 2, etc., provided on the fluid paths. Two output ports M1, M2 of the master cylinder MC are connected to input ports 121 of the pump body 10a, and output ports 122 of the pump body 10a are connected to the wheel brakes FR, FL, RR, RL, respectively. During normal operations, fluid paths from the input ports 121 to the output ports 122 inside the pump body 10a are connected to each other and form a hydraulic line so that the depressing force of the brake pedal BP is transmitted to the respective wheel brakes FL, RR, RL, FR.

It is shown that the fluid path starting from the output port M1 is connected to the left front wheel brake FL and the right rear wheel brake RR, while the fluid path starting from the output port M2 is connected to the right front wheel brake FR and the left rear wheel brake RL. Hereinafter, the fluid path starting from the output port M1 will be referred to as "first circuit" and the fluid path starting from the output port M2 will be referred to as "second circuit".

In the hydraulic pressure unit 10, two control valve units V corresponding to the wheel brakes FL, RR are provided in the first circuit, and two control valve units V corresponding to the wheel brakes RL, FR are provided in the second circuit. Moreover, a reservoir 3, a pump 4, an orifice 5a, a pressure-regulating valve (regulator) R, and a suction valve 7 are provided for each of the first circuit and the second circuit in this hydraulic pressure unit 10. Further provided in the hydraulic pressure unit 10 is a common motor 9 for driving the pump 4 in the first circuit and the pump 4 in the second circuit. This motor 9 is a motor that can be subjected to rotation speed control; in this embodiment, the rotation speed control is exercised by controlling the duty cycle. In this embodiment, a pressure sensor 8 is provided only in the second circuit.

The fluid paths from the output ports M1, M2 of the master cylinder MC to the pressure-regulating valves R are each called "output hydraulic line A1", and the fluid paths from the pressure-regulating valve R of the first circuit to the wheel brakes FL, RR, and the fluid paths from the pressure-regulating valve R of the second circuit to the wheel brakes RL, FR are each called "wheel hydraulic line B". The fluid paths from the output hydraulic line A1 to the pumps 4 are each called "suction hydraulic line C", and the fluid paths from the pumps 4 to the wheel hydraulic lines B are each called "discharge hydraulic line D", and the fluid paths from the wheel hydraulic lines B to the suction hydraulic lines C are each called "open path E".

The control valve units V comprise valves for controlling transmission of fluid pressure between the master cylinder MC or the pumps 4 and the wheel brakes FL, RR, RL, FR (specifically, the wheel cylinders H), and are capable of increasing, maintaining, and decreasing the pressure in the wheel cylinders H. To this end, the control valve unit V is configured to include an inlet valve 1, an outlet valve 2 and a check valve 1a.

The inlet valve 1 is a normally open proportional solenoid valve provided between each wheel brake FL, RR, RL, FR and the master cylinder MC, that is, on each of the wheel hydraulic lines B. Accordingly, a difference in pressure between upstream and downstream of the inlet valve 1 can be regulated according to a value of drive electric current applied to the inlet valve 1.

The outlet valve 2 is a normally closed solenoid valve provided between each wheel brake FL, RR, RL, FR and a corresponding reservoir 3, that is, between each of the wheel hydraulic lines B and a corresponding open path E. The outlet valve 2 is normally closed, and opened by the controller 20 when the wheels W threaten to lock up, so that the brake fluid pressure exerted on each wheel brake FL, RR, RL, FR is released to the corresponding reservoir 3.

The check valve 1a is connected in parallel to the corresponding inlet valve 1. The check valve 1a is a valve that allows the brake fluid to flow in only one direction from each wheel brake FL, FR, RL, RR toward the master cylinder MC; when the pressure input from the brake pedal BP is released, the brake fluid is allowed to flow from each wheel brake FL, FR, RL, RR toward the master cylinder MC even if the inlet valve 1 is closed.

The reservoir 3 is provided on the corresponding open path E, and has a function of temporarily holding a brake fluid released when the corresponding outlet valves 2 are opened. Between the reservoir 3 and the pump 4, a check valve 3a that allows a brake fluid to flow in only one direction from the reservoir 3 toward the pump 4 is provided.

The pump 4 is provided between the corresponding suction hydraulic line C connecting to the output hydraulic line A1 and the corresponding discharge hydraulic line D connecting to the wheel hydraulic line B, and has a function of sucking and discharging a brake fluid held in the corresponding reservoir 3, into the discharge hydraulic line D. Accordingly, the brake fluid accommodated in the reservoirs 3 can be returned to the master cylinder MC, to generate a brake fluid pressure, thereby providing a braking power to the wheel brakes FL, RR, RL, FR, irrespective of whether or not the brake pedal BP has been operated.

The amount of brake fluid discharged by the pump 4 depends on the rotation speed (duty cycle) of the motor 9. That is, the higher the rotation speed (duty cycle) of the motor 9, the greater the amount of brake fluid discharged by the pump 4 becomes.

The orifice 5a attenuates pulsation of pressure of a brake fluid discharged from the corresponding pump 4.

The pressure-regulating valve R has a function of allowing a brake fluid to flow from the output hydraulic line A1 to the wheel hydraulic line B during normal operations, and shutting off the flow to increase the pressure in the wheel cylinder H by the brake fluid pressure generated by the pump 4 and regulating a pressure in the corresponding wheel hydraulic line B and the corresponding wheel cylinder H to a value equal to or smaller than a preset value, and comprises a switching valve 6 and a check valve 6a.

The switching valve 6 is a normally open proportional solenoid valve provided between each of the output hydraulic lines A1 connected to the master cylinder MC and each of the wheel hydraulic lines B connected to the wheel brakes FL, FR, RL, RR. An actuated valve element of the switching valve 6 is, though a specific configuration thereof is not illustrated in the drawings, biased toward a closed position by an electromagnetic force produced according to an electric current as supplied; when the pressure in the wheel hydraulic line B becomes a value equal to or higher than the pressure the output hydraulic line A1 plus a predetermined value (this predetermined value depends on the electric current as supplied), the brake fluid flows from the wheel hydraulic line B to the output hydraulic line A1 whereby the pressure in the wheel hydraulic line B is adjusted to a predetermined pressure. In other words, a difference in pressure between upstream and downstream of the switching valve 6 can be regulated by changing a valve closing force as desired according to a value of drive electric current applied to the switching valve 6 (instructed electric current value), so that the pressure in the wheel hydraulic line B can be adjusted to a value equal to or lower than a set value.

The check valve 6a is connected in parallel to each switching valve 6. This check valve 6a is a unidirectional valve that allows the brake fluid to flow in only one direction from the output hydraulic line A1 toward the wheel hydraulic line B.

The suction valve 7 is a normally closed solenoid valve provided on the suction hydraulic line C, to cause the suction hydraulic line C to switch between an open state and a closed state. The suction valve 7 is opened under control of the controller 20 for example when the fluid pressures in the wheel brakes FL, FR, RL, RR are to be increased by the pumps 4.

The pressure sensor 8 is a device that detects a brake fluid pressure in the output hydraulic line A1, and its detection results are provided to the controller 20.

Next, details of the controller 20 will be described below.

Figure 3:
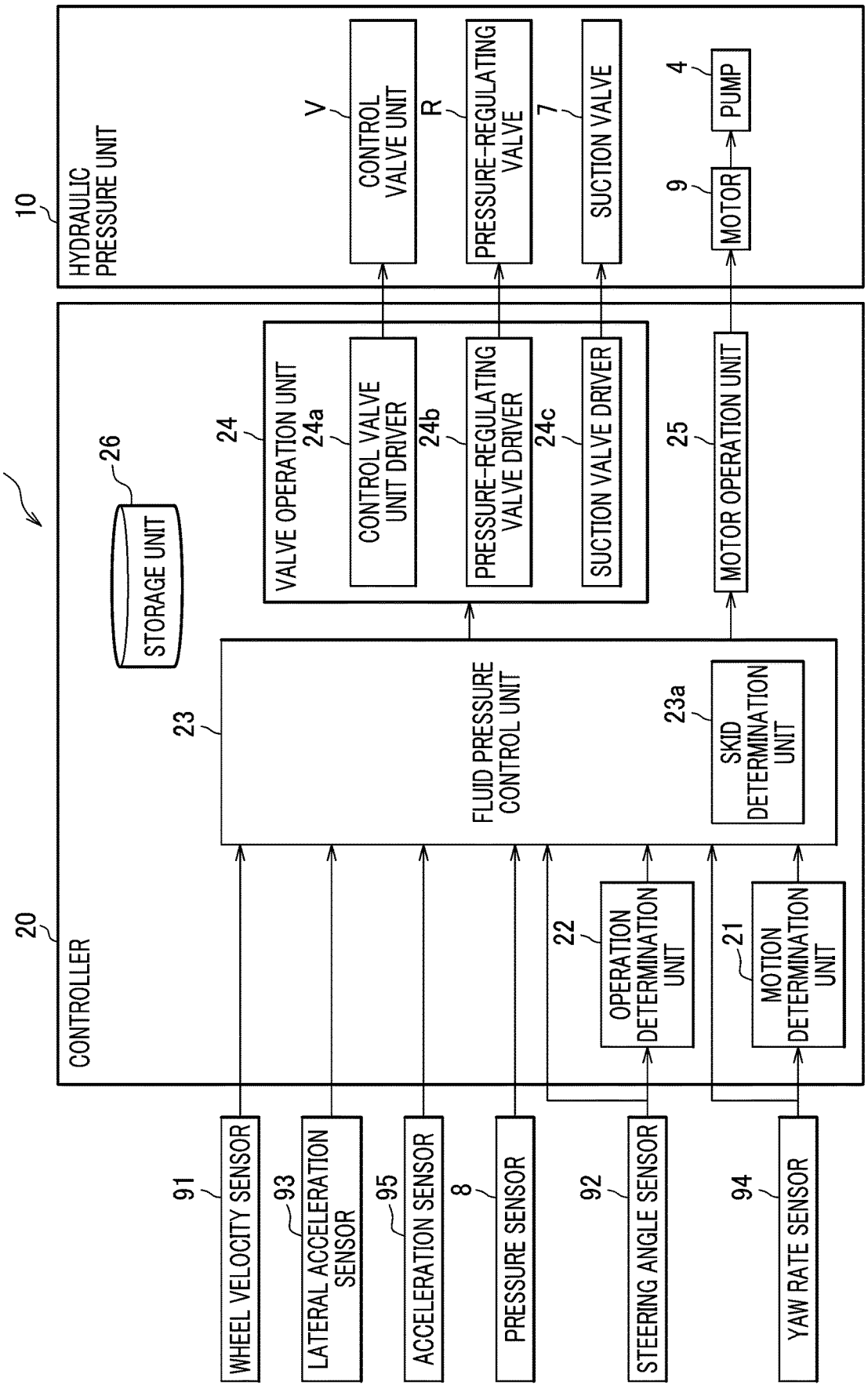
FIG. 3 is a block diagram of a controller.

As shown in FIG. 3, the controller 20 controls the opening/closing operations of the control valve unit V, the pressure-regulating valve R (switching valve 6), and the suction valve 7, and the operation of the motor 9 in the hydraulic pressure unit 10, based on signals received from the sensors 91 to 95 and 8, to thereby control the operations of the wheel brakes FL, RR, RL, FR. The controller 20 comprises a motion determination unit 21, an operation determination unit 22, a fluid pressure control unit 23, a valve operation unit 24, a motor operation unit 25, and a storage unit 26.

The motion determination unit 21 has a function of making a determination as to whether or not an absolute value of a yaw rate Y (hereinafter referred to simply as "yaw rate Y") outputted from the yaw rate sensor 94 is equal to or greater than a specified value Yth. If the motion determination unit 21 determines that the yaw rate Y is equal to or greater than the specified value Yth, then the motion determination unit 21 outputs a yaw rate observation signal to that effect, to the fluid pressure control unit 23.

The operation determination unit 22 has a function of making a determination as to whether or not a steering angle θ (absolute value) outputted from the steering angle sensor 92 is equal to or greater than a specified steering angle value θth to thereby make a determination as to whether or not an operation of the steering ST has been done. If it is determined that the operation has been done, this operation determination unit 22 outputs an operation signal to that effect, to the fluid pressure control unit 23.

It is to be understood that the specified value Yth and the specified steering angle value θth as described above may be set by experiment, simulation, etc. as appropriate.

The fluid pressure control unit 23 has a function of instructing the valve operation unit 24 and the motor operation unit 25 to operate the valves of various kinds and the motor 9 to regulate the brake fluid pressure, based on signals received from the sensors 91 to 95 and 8, in any of control modes of a plurality of kinds known in the art, which include: for example, an anti-skid control mode, a traction control mode, a vehicle stop time pressure holding control, etc. Herein, the vehicle stop time pressure holding control refers to a mode in which when the vehicle is stopped, a brake fluid pressure is held, for example, at a fluid pressure according to the depressing force of the brake pedal BP applied at a time when the vehicle has been stopped, or at a fluid pressure (raised by the pump 4) higher than the fluid pressure according to the depressing force of the brake pedal BP applied at the time when the vehicle has been stopped. The control modes of various kinds are stored in the storage unit 26.

The fluid pressure control unit 23 includes a skid determination unit 23a that makes a determination, based on a signal outputted from the motion determination unit 21 and the operation determination unit 22, as to whether or not the vehicle CR is getting into a sideway skid (making a sideslip), during the vehicle stop time pressure holding control. To be more specific, the skid determination unit 23a has a function of setting a first flag F1 to 1, indicative that a skid has occurred, if a first condition which includes a yaw rate Y being equal to or greater than a specified value Yth, and an absolute value G of frontward/rearward acceleration undergone by the vehicle CR being equal to or greater than a first threshold value G1 is fulfilled during the vehicle stop time pressure holding control (i.e. fulfilment of the first condition proves that a skid has occurred). Herein the first threshold G1 is set at a value corresponding to a road surface slope with which the turntable is practically not placed. Specifically, the first threshold value G1 is preferably but not necessarily set at a value corresponding to a road surface slope of 10-15%, and more preferably but not necessarily set at a value corresponding to a road surface slope of 11-13%.

The skid determination unit 23a has a function of setting a second flag F2 to 1, indicative that a skid has occurred, if a second condition which includes the yaw rate Y being equal to or greater than the specified value Yth, the steering ST having been operated, and the absolute value G of the frontward/rearward acceleration being equal to or greater than a second threshold value G2 smaller than the first threshold value G1 is fulfilled during the vehicle stop time pressure holding control (i.e. fulfilment of the second condition also proves that a skid has occurred). Herein, the second threshold value G2 may be set at an extremely small value irrespective of the condition under which the turntable may be placed, for example, at a value corresponding to a road surface slope equal to or smaller than 5%.

The fluid pressure control unit 23 has a function of making a determination as to whether or not the vehicle CR has been stopped, and if it is determined that the vehicle CR has been stopped, then starting a vehicle stop time pressure holding control. Herein, the determination as to whether or not the vehicle CR has been stopped may be made by any method; for example, the method may include determination made as to whether or not a vehicle body velocity computed based on signals from the wheel velocity sensors 91 is equal to or lower than a predetermined value V1 (see FIG. 7(a)), to thereby determine whether or not the vehicle CR has been stopped.

The fluid pressure control unit 23 is configured such that if the first flag F1 or the second flag F2 is 1 during the vehicle stop time pressure holding control, then the vehicle stop time pressure holding control is canceled irrespective of whether or not the known cancellation condition has been fulfilled. In other words, the fluid pressure control unit 23 is configured such that if the first condition or the second condition is fulfilled during the vehicle stop time pressure holding control, the vehicle stop time pressure holding control is canceled. In particular, the fluid pressure control unit 23 is configured such that if the first condition is fulfilled during the vehicle stop time pressure holding control, the vehicle stop time pressure holding control is canceled even without operation of a vehicle stop time pressure holding control switch or the steering ST.

Herein, the vehicle stop time pressure holding control switch is a switch for selectively enabling and disabling execution of the vehicle stop time pressure holding control by the controller 20. When the vehicle stop time pressure holding control switch is ON, if a condition for starting the vehicle stop time pressure holding control has been fulfilled, the controller 20 executes the vehicle stop time pressure holding control. On the other hand, when the vehicle stop time pressure holding control switch is OFF, even if the condition for starting the vehicle stop time pressure holding control has been fulfilled, the controller 20 does not execute the vehicle stop time pressure holding control. Furthermore, during the vehicle stop time pressure holding control, if the vehicle stop time pressure holding control switch is turned from ON to OFF, the vehicle stop time pressure holding control is canceled.

The known cancellation condition may include, for example, operation for pulling away having been done with a shift position "D" or "R".

The valve operation unit 24 is a unit that exercises control, based on an instruction from the fluid pressure control unit 23, over the control valve units V, the pressure-regulating valves R, and the suction valves 7. To this end, the valve operation unit 24 comprises a control valve unit driver 24a, a pressure-regulating valve driver 24b, and a suction valve driver 24c.

The control valve unit driver 24a exercises control, based on an instruction on increase, hold, and decrease of pressure given from the fluid pressure control unit 23, over the inlet valves 1 and the outlet valves 2. To be more specific, when the pressure of a wheel cylinder H is to be increased, no electric current is applied to the inlet valve 1 or the outlet valve 2. On the other hand, when the pressure of the wheel cylinder H is to be decreased, signals are transmitted to the both of the inlet valve 1 and the outlet valve 2 to close the inlet valve 1 and open the outlet valve 2 so that the brake fluid in the wheel cylinder H is flowed out through the outlet valve 2. When the pressure in the wheel cylinder H is to be held, a signal is transmitted to the inlet valve 1 and no electric current is applied to the outlet valve 2 so that the both of the inlet valve 1 and the outlet valve 2 are closed.

The pressure-regulating valve driver 24b does not apply electric current to the pressure-regulating valves R during normal operations. When an instruction to drive is given from the fluid pressure control unit 23, the pressure-regulating valve 24b supplies an electric current to a pressure-regulating valve R under duty cycle control according to the instruction. When an electric current is supplied to the pressure-regulating valve R, a difference in pressure is formed according to the supplied electric current across the pressure-regulating valve R between the master cylinder MC side and the control valve unit V (wheel cylinder H) side. As a result, the fluid pressure in the discharge hydraulic pressure line D between the pressure-regulating valve R and the control valve unit V is regulated.

The suction valve driver 24c does not apply electric current to the suction valves 7 during normal operations. When an instruction is given from the fluid pressure control unit 23, the suction valve driver 24c outputs a signal according to this instruction to a suction valve 7. Accordingly, the suction valve 7 is opened and the brake fluid is sucked from the master cylinder MC into the pump 4.

The motor operation unit 25 is a unit that determines a rotation speed of the motor 9 and activates the motor 9, based on an instruction from the fluid pressure control unit 23. In other words, the motor operation unit 25 operates the motor 9 under the rotation speed control; in this embodiment, the rotation speed control is exercised by controlling the duty cycle.

Next, an operation of the controller 20 will be described with reference to FIGS. 4 to 6.

Figure 4:
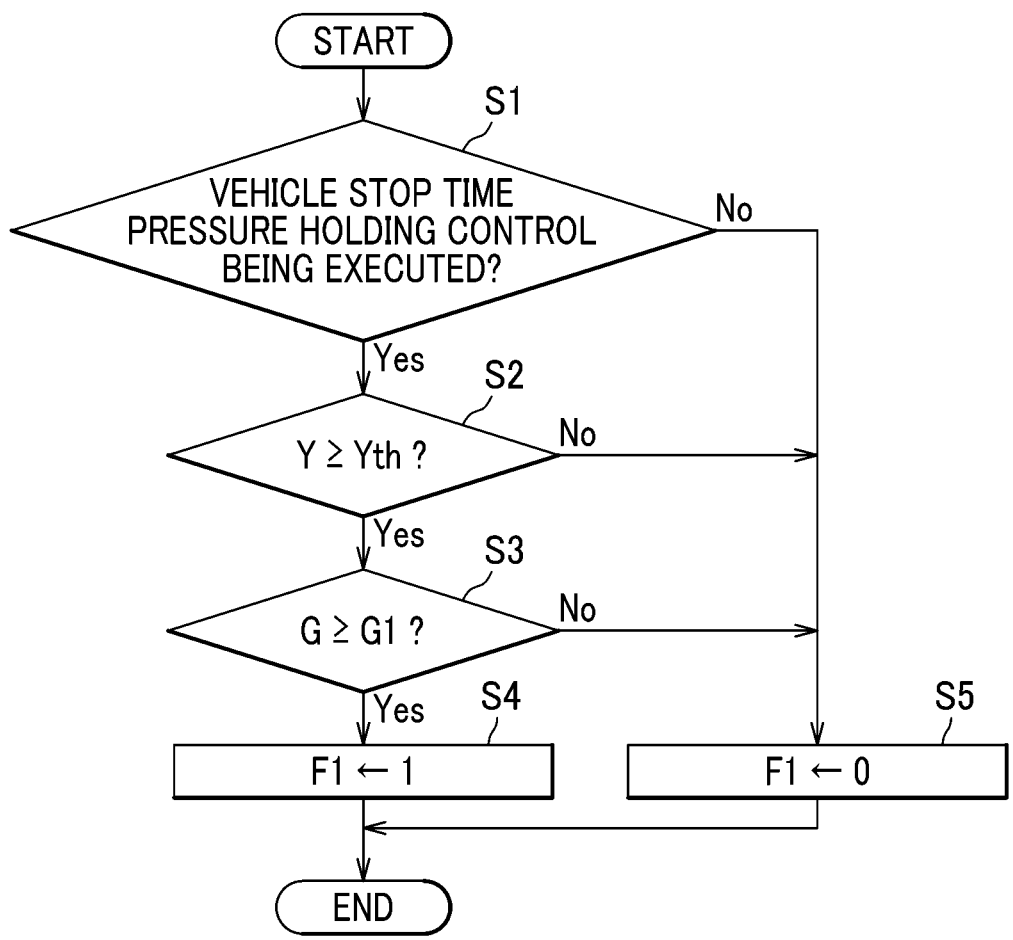
FIG. 4 is a flowchart showing a process of determination as to whether or not a first condition is fulfilled.
Figure 5:
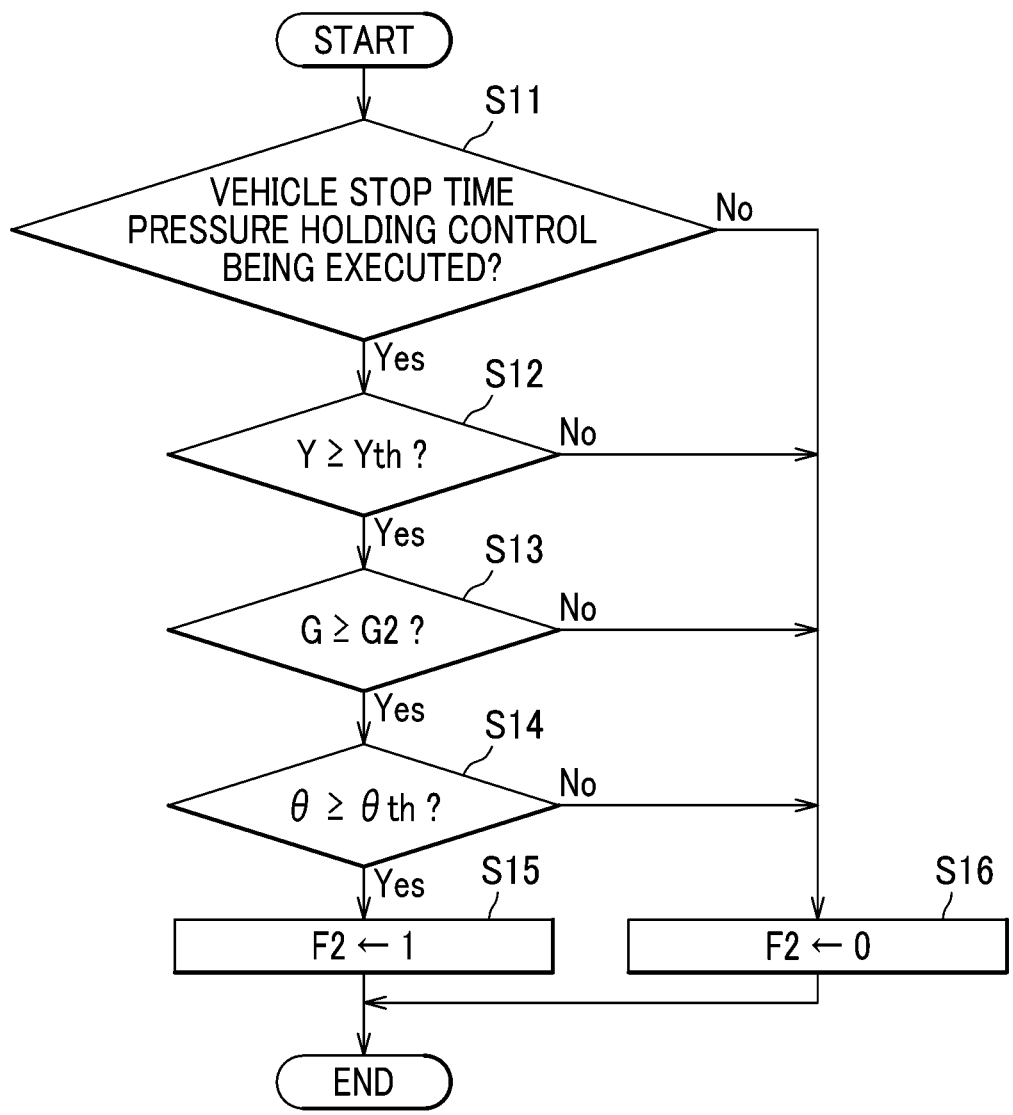
FIG. 5 is a flowchart showing a process of determination as to whether or not a second condition is fulfilled.
Figure 6:
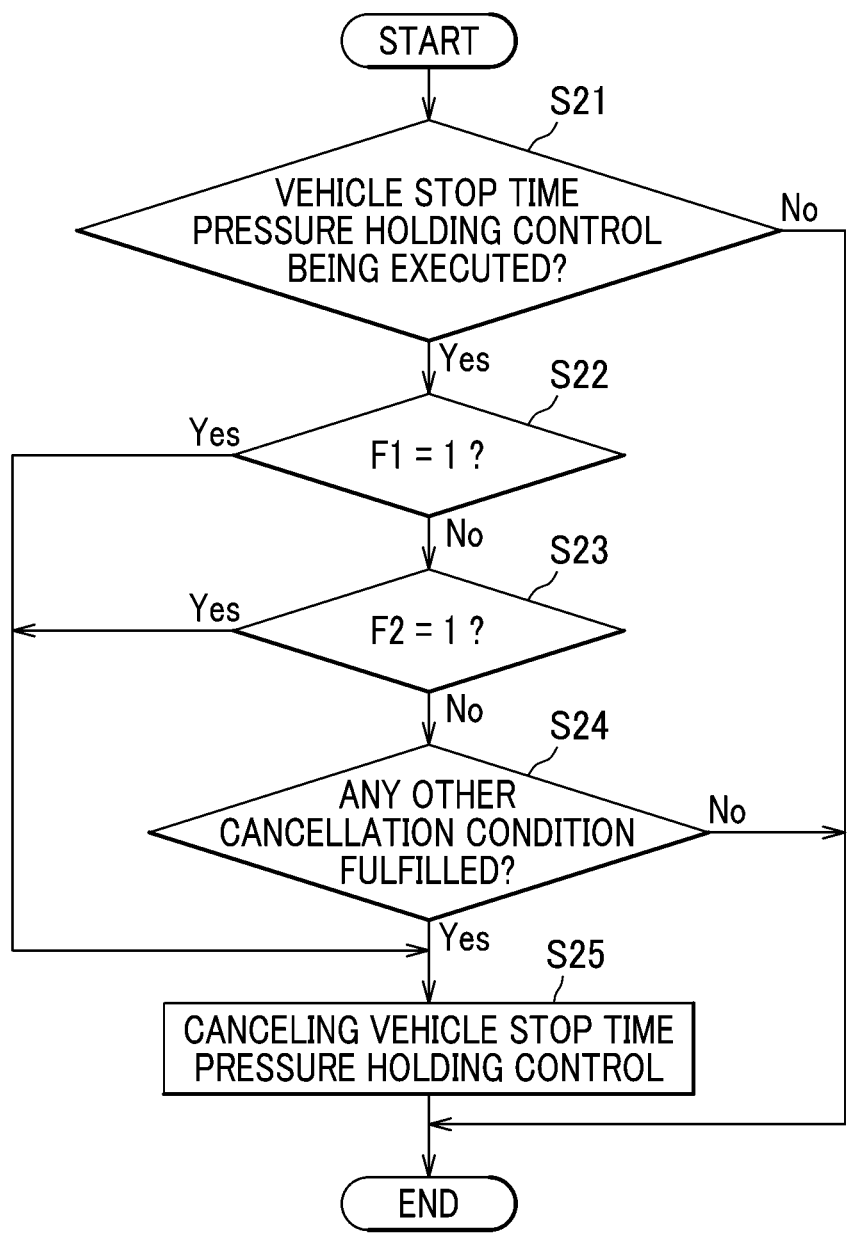
FIG. 6 is a flowchart showing a process for cancellation of a vehicle stop time pressure holding control.

The controller 20 normally executes a skid determination process as shown in FIGS. 4 and 5 and a process for cancellation of a vehicle stop time pressure holding control as shown in FIG. 6, repeatedly.

In the process shown in FIG. 4, the controller 20 first makes a determination as to whether or not the vehicle stop time pressure holding control is being executed (S1). If it is determined in step S1 that the vehicle stop time pressure holding control is being executed (Yes), then the controller 20 makes a determination as to whether or not the yaw rate Y at which the vehicle CR turns is equal to or greater than the specified value Yth (S2).

If it is determined in step S2 that Y≥Yth (Yes), then the controller 20 makes a determination as to whether or not the absolute value G of the frontward/rearward acceleration is equal to or greater than the first threshold value G1 (S3). If it is determined in step S3 that G≥G1 (Yes), then the controller 20 determines that the first condition is fulfilled, sets the first flag F1 to 1 (S4), and brings the process to an end.

If determination in any of steps S1 to S3 results in No, the controller 20 sets the first flag F1 to 0 (S5), and brings the process to an end.

In the process shown in FIG. 5, the controller 20 first makes a determination as to whether or not the vehicle stop time pressure holding control is being executed (S11). If it is determined in step S11 that the vehicle stop time pressure holding control is being executed (Yes), then the controller 20 makes a determination as to whether or not the yaw rate Y at which the vehicle CR turns is equal to or greater than the specified value Yth (S12).

If it is determined in step S12 that Y≥Yth (Yes), then the controller 20 makes a determination as to whether or not the absolute value G of the frontward/rearward acceleration is equal to or greater than the second threshold value G2 (S13). If it is determined in step S13 that G≥G2 (Yes), then the controller 20 makes a determination as to whether or not the steering angle θ of the steering ST is equal to or greater than the specified steering angle value θth (S14).

If it is determined in step S14 that θ≥θth (Yes), then the controller 20 determines that the second condition is fulfilled, sets the second flag F2 to 1 (S15), and brings the process to an end.

If determination in any of steps S11 to S14 results in No, the controller 20 sets the second flag F2 to 0 (S16), and brings the process to an end.

In the process shown in FIG. 6, the controller 20 first makes a determination as to whether or not the vehicle stop time pressure holding control is being executed (S21). If it is determined in step S21 that the vehicle stop time pressure holding control is not being executed (No), then the controller 20 brings the process to an end.

If it is determined in step S21 that the vehicle stop time pressure holding control is being executed (Yes), then the controller 20 makes a determination as to whether or not the first flag F1 is 1 (S22). If it is determined in step S22 that the first flag F1 is not 1 (No), then the controller 20 makes a determination as to whether or not the second flag F2 is 1 (S23). If it is determined in step S23 that the second flag F2 is not 1 (No), then the controller 20 makes a determination as to whether or not any other cancellation condition has been fulfilled (S24).

If the determination in step S22 indicates that the first flag F1 is 1 (Yes), the determination in step S23 indicates that the second flag F2 is 1 (Yes), or the determination in step S24 indicates that other cancellation condition has been fulfilled (Yes), the controller 20 cancels the vehicle stop time pressure holding control (S25), and brings the process to an end. If the determination in step S24 indicates that no other cancellation condition has been fulfilled (No), then the controller 20 brings the process to an end without canceling the vehicle stop time pressure holding control. Thus, in this case, the vehicle stop time pressure holding control continues to be executed.

Figure 7:
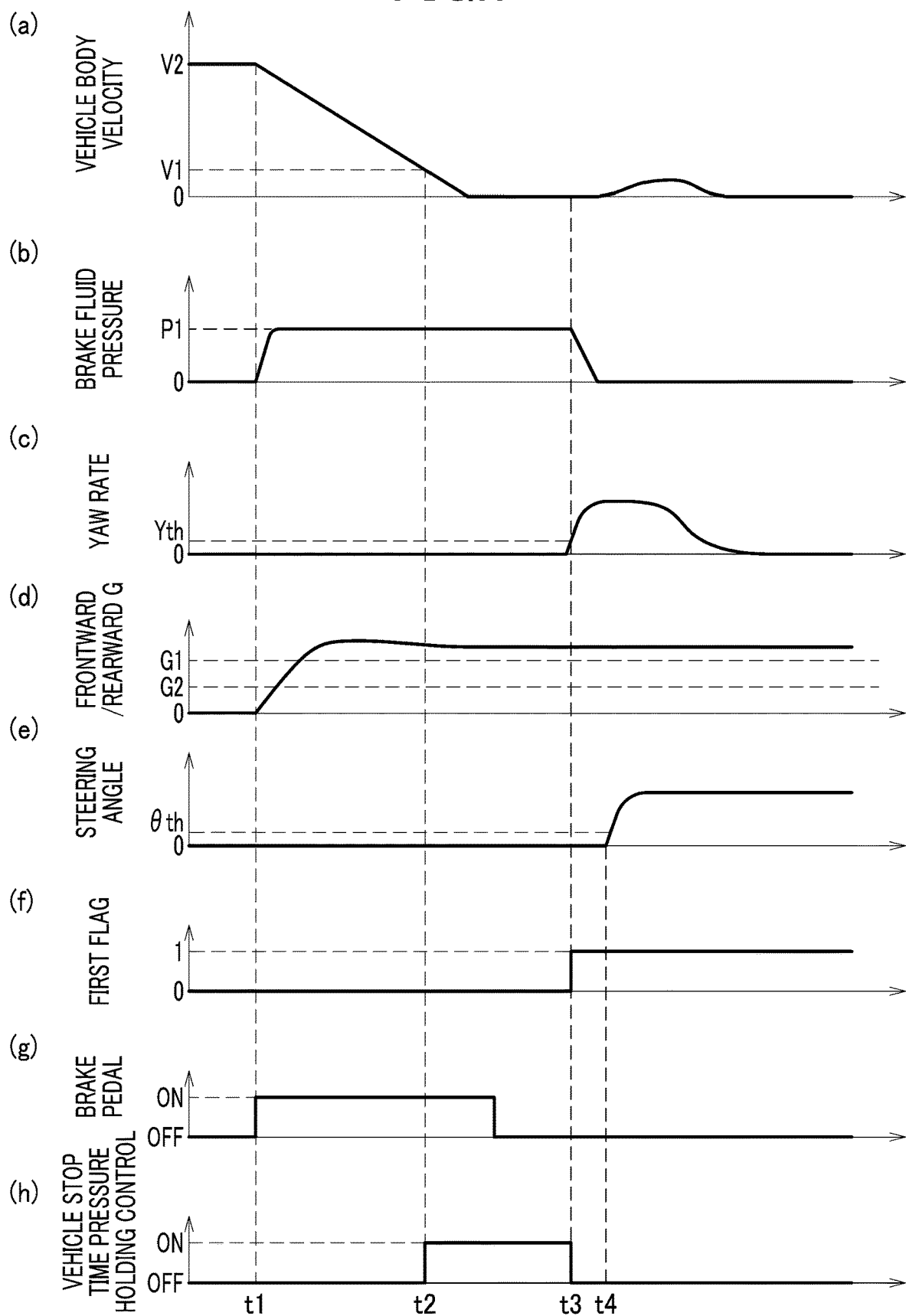
FIG. 7 includes timing charts (a) to (h) showing various parameters changing when the vehicle stop time pressure holding control is canceled on the first condition.
Figure 8:
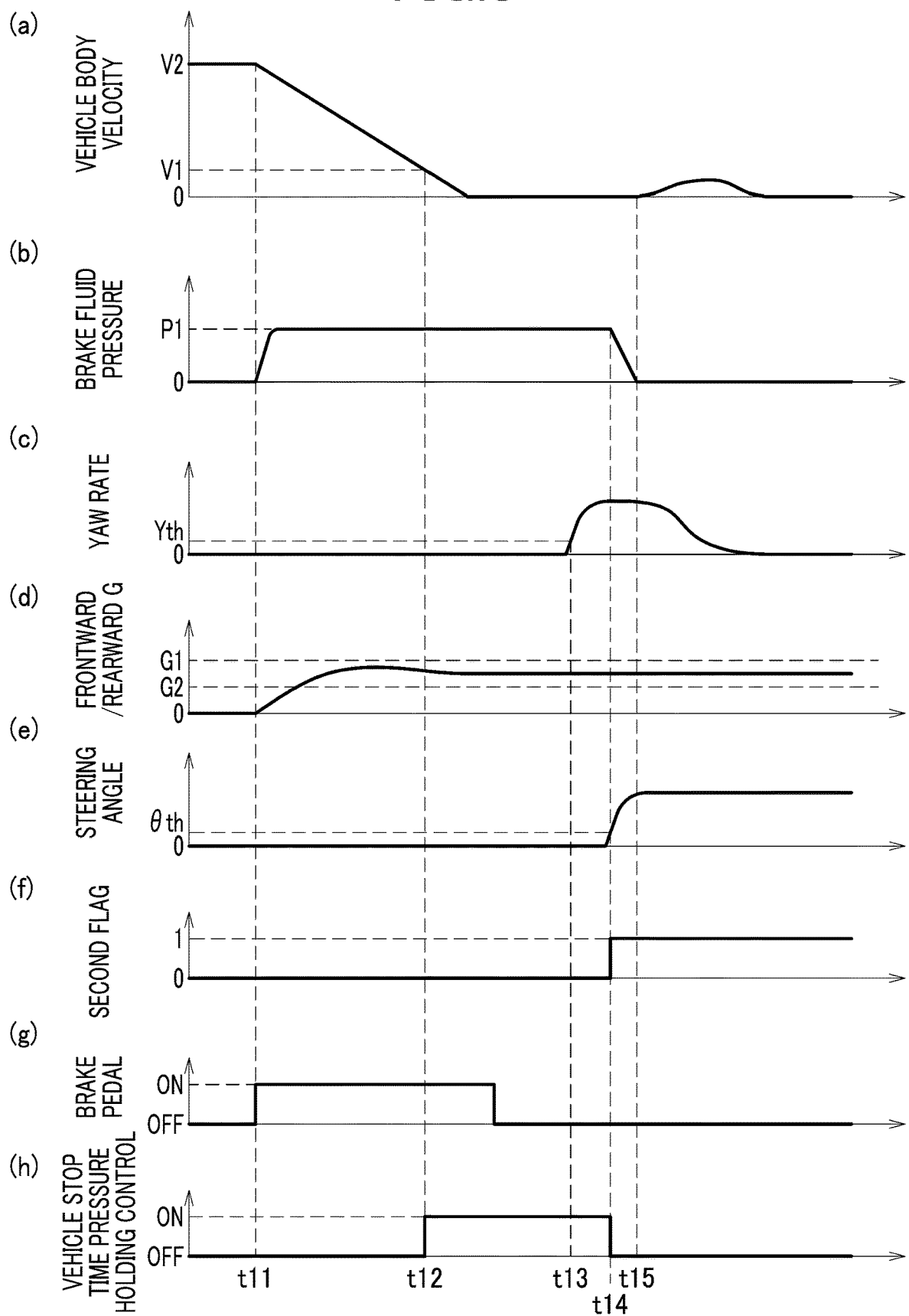
FIG. 8 includes timing charts (a) to (h) showing various parameters changing when the vehicle stop time pressure holding control is canceled on the second condition.

Next, a description will be given of a process of control executed when the first condition or the second condition is fulfilled during the vehicle stop time pressure holding control, with reference to FIGS. 7 and 8. It is to be understood that the yaw rate, steering angle, and frontward/rearward acceleration shown in FIGS. 7 and 8 are indicated as absolute values, for convenience' sake. For the vehicle body velocity, values assumed from the wheel velocities are shown. At the outset, referring to FIG. 7, a control process exercised when the first condition is fulfilled during the vehicle stop time pressure holding control is described below.

As shown in FIGS. 7 (a), (b) and (g), when a driver in a vehicle CR running at a vehicle body velocity V2 depresses the brake pedal PD (time t1), the brake fluid pressure in the wheel cylinder H increases gradually, and the vehicle body velocity decreases gradually. When the vehicle body velocity decreases to a predetermined value V1 (time t2), a determination is made that the vehicle CR is stopping, and the vehicle stop time pressure holding control is executed, for example, with a brake fluid pressure P1 at the time of the determination (see FIG. 7 (h)). In the example shown in FIG. 7, it is assumed that the vehicle CR is stopping on a downhill having a road surface slope greater than a slope corresponding to the first threshold value G1.

After the controller 20 determines that the vehicle CR is stopping, the absolute value G of the frontward/rearward acceleration undergone by the vehicle CR may assume a value equal to or greater than the first threshold value G1 as shown in FIG. 7 (d), and if the road surface is a surface having a low coefficient of friction such as an ice-glazed road surface, the vehicle CR may not stop in actuality but slide onward while turning.

In this case, as shown in FIG. 7 (c), the vehicle CR turns at a yaw rate Y equal to or greater than the specified value Yth (time t3); thus, as shown in FIGS. 7 (f) and (h), the first condition is fulfilled at this point in time and the first flag F1 is set to 1, so that the vehicle stop time pressure holding control is canceled. Accordingly, from the time t3 forward, the brake fluid pressure decreases; thus, the wheel lockup is resolved and the grip of the wheels W is restored so that the vehicle CR can be operated. Therefore, when the driver performs a steering operation to right the vehicle CR (time t4), the position of the vehicle CR can be recovered by the driver's operation.

Next, referring to FIG. 8, a control process exercised when the second condition is fulfilled during the vehicle stop time pressure holding control is described below.

As shown in FIGS. 8 (a), (b) and (g), when a driver in a vehicle CR running at a vehicle body velocity V2 depresses the brake pedal BP (time t11), the brake fluid pressure in the wheel cylinder H increases gradually, and the vehicle body velocity decreases gradually. When the vehicle body velocity decreases to a predetermined value V1 (time t12), a determination is made that the vehicle CR is stopping, and the vehicle stop time pressure holding control is executed with a brake fluid pressure P1 at the time of the determination (see FIG. 8 (h)). In the example shown in FIG. 8, it is assumed that the vehicle CR is stopping on a downhill having a road surface slope smaller than a slope corresponding to the first threshold value G1.

After the controller 20 determines that the vehicle CR is stopping, the absolute value G of the frontward/rearward acceleration undergone by the vehicle CR may assume a value smaller than the first threshold value G1 and equal to or greater than the second threshold value G2 as shown in FIG. 8 (d), and if the road surface is a surface having a low coefficient of friction such as an ice-glazed road surface, the vehicle CR may not stop in actuality but slide onward while turning.

If such a phenomenon occurs, the yaw rate Y may be observed during the vehicle stop time pressure holding control (time t12 to t14), and this yaw rate Y may exceed the specified value Yth (time t13), as shown in FIGS. 8 (c) and (h). In this case, the driver may perform a steering operation to right the vehicle CR. When the steering angle θ exceeds the specified steering angle value θth (time t14), as shown in FIG. 8 (e), by the steering operation, the second condition is fulfilled at this point in time and the second flag F2 is set to 1, so that the vehicle stop time pressure holding control is canceled, as shown in FIGS. 8 (f) and (h).

Accordingly, as shown in FIG. 8 (b), the brake fluid pressure which has been held by the vehicle stop time pressure holding control decreases; thus, the lockup of the wheels W is resolved (time t15) as shown in FIG. 8 (a). Therefore, the grip of the wheels W is restored so that the vehicle CR can be operated, with the result that the position of the vehicle CR can be recovered by the driver's operation.

In the present embodiment, as described above, the following advantageous effects can be achieved.

If the first condition is fulfilled, the vehicle stop time pressure holding control is canceled even without operation of the steering ST; therefore, the vehicle stop time pressure holding control can be canceled quickly. By setting the first threshold G1 at a value corresponding to a road surface slope with which the turntable is practically not placed, the brake fluid pressure can be restrained from decreasing counter to driver's intent even when a yaw rate at which the vehicle on the turntable turns is observed.

Since the second condition is tested for determination as to whether to cancel the vehicle stop time pressure holding control when the downhill is such a gentle slope that the turntable may be placed thereon, the vehicle stop time pressure holding control is not canceled even when the absolute value G of the frontward/rearward acceleration is equal to or greater than the second threshold value G2 and the yaw rate Y is equal to or greater than the specified value Yth, unless the steering operation is performed. Therefore, even if the vehicle CR turns, for example, at a yaw rate Y equal to or greater than the specified value Yth on the turntable, the brake fluid pressure can be restrained from decreasing counter to driver's intent. When the vehicle CR slides down while turning round under the vehicle stop time pressure holding control on a slope having a low coefficient of friction such as an ice-glazed road surface, the steering operation performed by the driver in an attempt to regain control over the vehicle will cause the vehicle stop time pressure holding control to be canceled, and cause the brake fluid pressure to decrease, whereby the driver can regain control over the vehicle successfully.

Since the second condition includes a condition that the operation of the steering ST has been done, an error in determination which would occur when the vehicle is on the turntable can be restrained even when the second threshold G2 is set at a value corresponding to a road surface slope small enough for the turntable to be placed therewith. In addition, even if the condition related to the frontward/rearward acceleration is removed from the second condition, the error in determination which would occur on the turntable can be restrained by the condition related to the operation of the steering ST.

Since a turntable is practically not placed on a great road surface slope such as 10% or more, setting the first threshold value G1 at a value corresponding to a road surface slope equal to or greater than 10% can serve to restrain an error in determination which would occur on the turntable. Furthermore, when the first threshold value G1 is set at a value corresponding to a road surface slope equal to or greater than 11%, the error in determination on the turntable can be restrained more effectively.

When the first threshold value G1 is set at a value corresponding to a road surface slope equal to or smaller than 15%, the vehicle CR can be restrained from sliding down on a road surface with a slope equal to or smaller than 15% effectively in comparison with an alternative configuration, for example, in which the first threshold value is set at a value corresponding to a road surface slope greater than 15%. When the first threshold value G1 is set at a value corresponding to a road surface slope equal to or smaller than 13%, the vehicle CR can be restrained from sliding down on a road surface with a slope equal to or smaller than 13%.

The above-described embodiment may be modified and implemented in various forms as will be illustrated below.

In the above-described embodiment, a yaw rate is taken as an example of an amount of lateral motion of the vehicle, but the amount of lateral motion may be a lateral acceleration, for example, as detected by a lateral acceleration sensor. It is however to be understood that when a yaw rate is adopted as the amount of lateral motion as in the above-described embodiment, the state of sideslip (sideways skid) of the vehicle can be determined properly based on the yaw rate.

In the above-described embodiment, the vehicle stop time pressure holding control switch or the steering ST is taken as an example of the operation member; however, the operation member may, for example, be a brake, an accelerator or the like.

In the above-described embodiment, a pressure decreasing control (control under which a pressure is decreased when the vehicle stop time pressure holding control is canceled) is executed by exercising control over the pressure-regulating valves R; however, if a so-called electromechanical booster in which a motor is operated to move a piston inside the master cylinder is used to hold and decrease a brake fluid pressure, the vehicle stop time pressure holding control and its cancellation may be performed by controlling the electromechanical booster.

The elements explained in the above-described embodiments and modified examples may be implemented in combination where appropriate.

The invention claimed is:

1. A vehicle brake fluid pressure control device capable of exercising a vehicle stop time pressure holding control under which a brake fluid pressure is held when it is determined that a vehicle has been stopped, wherein the vehicle brake fluid pressure control device is configured such that when a vehicle stop time pressure holding control switch for selectively enabling and disabling execution of the vehicle stop time pressure holding control is ON, if a condition for starting the vehicle stop time pressure holding control has been fulfilled, the vehicle stop time pressure holding control is executed, and when the vehicle stop time pressure holding control switch is OFF, even if the condition for starting the vehicle stop time pressure holding control has been fulfilled, the vehicle stop time pressure holding control is not executed, and the vehicle brake fluid pressure control device is configured such that if a first condition which includes an amount of lateral motion of the vehicle being equal to or greater than a specified value, and an absolute value of frontward/rearward acceleration undergone by the vehicle being equal to or greater than a first threshold is fulfilled during the vehicle stop time pressure holding control, the vehicle stop time pressure holding control is canceled even if the vehicle stop time pressure holding control is not switched off and an operation member for operating the vehicle is not operated.

2. The vehicle brake fluid pressure control device according to claim 1, wherein if a second condition which includes the amount of lateral motion of the vehicle being equal to or greater than the specified value and the operation of the operation member for operating the vehicle having been done is fulfilled during the vehicle stop time pressure holding control, the vehicle stop time pressure holding control is canceled.

3. The vehicle brake fluid pressure control device according to claim 2, wherein the second condition further includes the absolute value of the frontward/rearward acceleration undergone by the vehicle being equal to or greater than a second threshold.

4. The vehicle brake fluid pressure control device according to claim 3, wherein the first threshold is greater than the second threshold.

5. The vehicle brake fluid pressure control device according to claim 1, wherein the first threshold is set based on an estimated road surface slope.

\* \* \* \* \*